(12) United States Patent
Chang et al.

(10) Patent No.: US 9,390,198 B2
(45) Date of Patent: Jul. 12, 2016

(54) HEAT MAP OF SUGGESTED SEARCH QUERIES

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/020,148

(22) Filed: Sep. 6, 2013

(65) Prior Publication Data

US 2015/0074137 A1    Mar. 12, 2015

(51) Int. Cl.
G06F 17/30    (2006.01)

(52) U.S. Cl.
CPC ...... *G06F 17/30973* (2013.01); *G06F 17/3097* (2013.01)

(58) Field of Classification Search
None
See application file for complete search history.

(56) References Cited

U.S. PATENT DOCUMENTS

| | | |
|---|---|---|
| 8,407,199 B2 | 3/2013 | Kritt et al. |
| 8,856,099 B1 * | 10/2014 | Lasko et al. ............ 707/706 |
| 2008/0243819 A1 | 10/2008 | Sareen et al. |
| 2009/0144271 A1 | 6/2009 | Richardson et al. |
| 2012/0015674 A1 | 1/2012 | LeBeau et al. |
| 2012/0054211 A1 | 3/2012 | Arsenault et al. |
| 2012/0131035 A1 * | 5/2012 | Yang ............ G06F 17/3064 707/767 |
| 2012/0185498 A1 * | 7/2012 | Loofbourrow .... G06F 17/30395 707/767 |
| 2012/0209835 A1 | 8/2012 | Ahari et al. |
| 2012/0269116 A1 | 10/2012 | Xing et al. |
| 2012/0278355 A1 | 11/2012 | Kritt et al. |
| 2012/0296926 A1 | 11/2012 | Kalin et al. |

OTHER PUBLICATIONS

Ahmad, F. et al., "Learning a Spelling Error Model from Search Query Logs," Proceedings of Human Language Technology Conference and Conference on Empirical Methods in Natural Language Processing (HLT/EMNLP), pp. 955-962, Vancouver, Canada, Oct. 2005, © 2005 Association for Computational Linguistics.

Chellapilla, K. et al, "Improving Cloaking Detection Using Search Query Popularity and Monetizability," AirWeb'06, Aug. 10, 2006, Seattle, WA.

* cited by examiner

*Primary Examiner* — Hung Q Pham
(74) *Attorney, Agent, or Firm* — Scott S. Dobson; Joe Polimeni

(57) ABSTRACT

A search query portion is received. A plurality of suggested search queries is identified based on the search query portion. Feature values are determined for each of the plurality of suggested search queries based on a feature display preference. A heat map of the suggested search queries is transmitted to a client computer system. The heat map contains a plurality of blocks visually representing the plurality of suggested search queries and the determined feature values.

13 Claims, 4 Drawing Sheets

HEAT MAP OF SUGGESTED SEARCH QUERIES

FIELD OF THE INVENTION

The present disclosure relates to the field of search engines and more particularly to display of search query suggestions.

BACKGROUND

When a computer system user begins typing a search query into a search box, many search engines provide a drop down list under the search box which offers selectable suggestions for related query terms. These drop down lists typically contain only text of suggested search query terms and lack any further information regarding the suggested search query terms.

SUMMARY

Disclosed herein are embodiments of computer implemented method. The method includes receiving a search query portion and identifying a plurality of suggested search queries based on the search query portion. Feature values are determined for each of the plurality of suggested search queries based on a feature display preference. A heat map of the suggested search queries is transmitted to a client computer system. The heat map contains a plurality of blocks visually representing the plurality of suggested search queries and the determined feature values.

Also disclosed herein are embodiments of a computer program product. The computer program product includes a computer readable storage medium having program code embodied therewith. The program code is executable by a computer system to perform a method. The method includes receiving a search query portion and identifying a plurality of suggested search queries based on the search query portion. Feature values are determined for each of the plurality of suggested search queries based on a feature display preference. A heat map of the suggested search queries is transmitted to a client computer system. The heat map contains a plurality of blocks visually representing the plurality of suggested search queries and the determined feature values.

Also disclosed herein are embodiments of a computer system. The computer system includes one or more processors, one or more computer-readable memories, one or more computer-readable tangible storage devices, and program instructions stored on at least one of the one or more storage devices for execution by at least one of the one or more processors via at least one of the one or more memories. The program instructions for execution include program instructions to receive a search query portion, program instructions to identify a plurality of suggested search queries based on the search query portion, program instructions to determine a feature value for each of the plurality of suggested search queries based on a feature display preference and program instructions to transmit to a client computer system a heat map of the suggested search queries, the heat map containing a plurality of blocks visually representing the plurality of suggested search queries and the determined feature values.

DETAILED DESCRIPTION

In this detailed description, reference is made to the accompanying drawings, which illustrate example embodiments. It is to be understood that other embodiments may be utilized and structural changes may be made without departing from the scope of the invention. The terminology used herein is for the purpose of describing particular embodiments only and is not intended to be limiting of the invention. In accordance with features of the invention, a method, a system, and a computer program product are provided for transmitting suggested search queries in a heat map.

The heat map may contain several blocks with each block representing a suggested search query. The color of each block may represent a feature value of the respective suggested search query. The feature value may represent any feature of the respective suggested search query. Example features include the number of search results which the query would return, the number of recommended results which the query would return, or the popularity of the query. The feature represented by the feature value may be determined by a feature display preference. The feature display preference may be predetermined or may be chosen by a user of the client computer system. The user of the client computer system may select one or more of the blocks of the heat map for execution by a search engine on one or more data sources. In some embodiments, the user may select a conjunction for combining the suggested search queries represented by the selected blocks.

Figure 1:
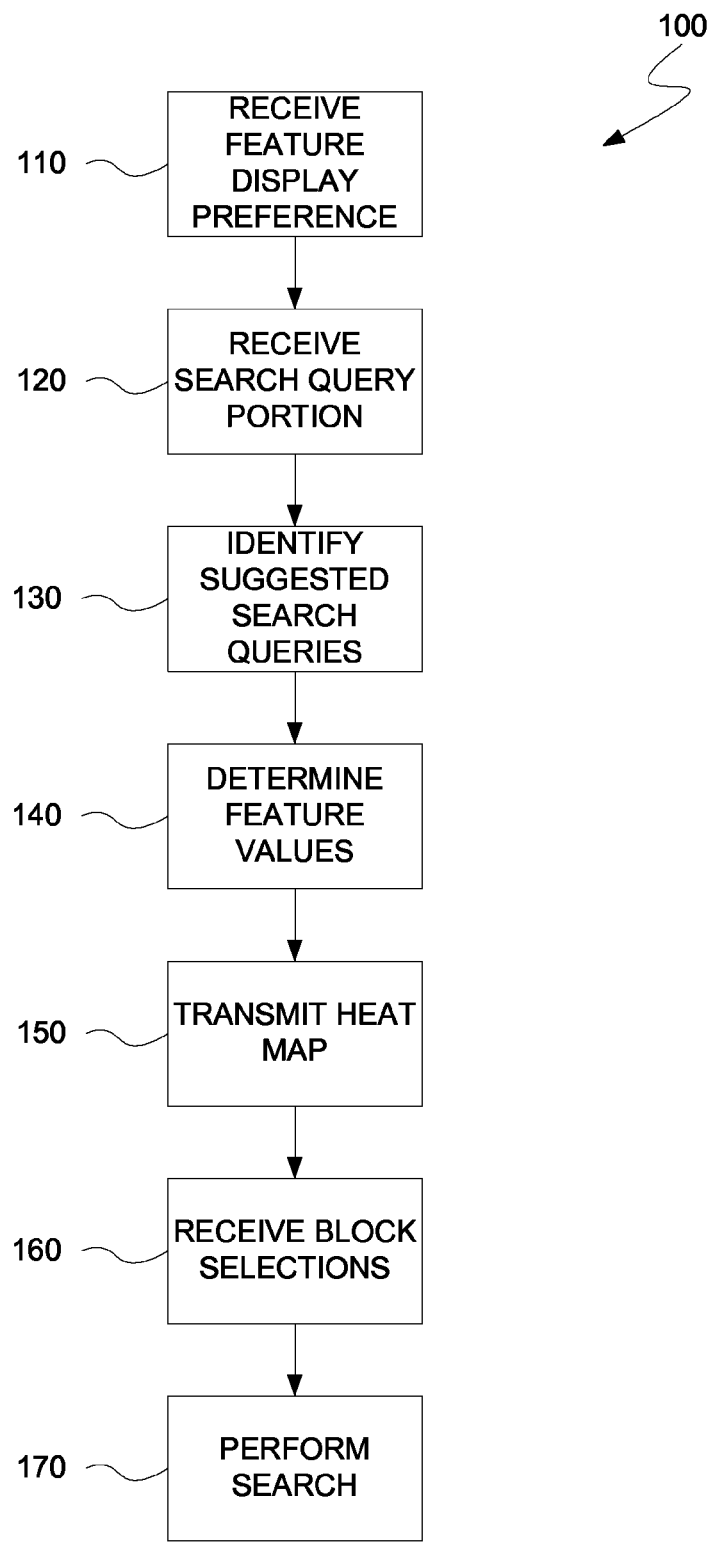
FIG. 1 depicts a flow diagram of an example method for providing a heat map of suggested search queries.

Referring now FIG. 1, flow diagram 100 illustrates an example embodiment of a method for providing suggested search queries to a client computer system. The client computer system may be any computer system such as a desktop, laptop, mobile phone, or tablet. At step 110, a feature display preference is received from the client computer system. Example feature display preferences include "search results," "popularity," and "recommendations." In some embodiments, the feature display preference is predetermined and is not received from the client computer system. At step 120, a search query portion is received from the client computer system. The search query portion may be entered by the user of the client computer system into a graphical interface.

At step 130, suggested search queries are identified. There are methods known in the art for identifying suggested search queries from a search query portion. Some methods use data collected from previous searches to predict what the user will want to search. Any method for identifying suggested search queries may be used. At step 140, feature values are determined for each of the suggested search queries. The feature which the feature values represent may be determined by the feature display preference. For example, the feature display preference "search results" may indicate the feature of the number of search results which the suggested search query would return. The feature display preference "popularity" may indicate the feature of how many times the suggested search query has been searched in the past. The feature display preference "recommendations" may indicate the feature of the number of recommended search results which the suggested search query would return. These feature display preferences are described for example only and are not intended to be limiting.

At step 150, a heat map visually representing the suggested search queries is transmitted to the client computer system. The heat map may contain several blocks with each block representing a suggested search query. The color of each block may represent the magnitude of the determined feature value for the respective suggested search query. For example, the heat map may display the block with the highest feature value as dark green and the block with the lowest feature value as dark red. Blocks with feature values in-between the highest and lowest values may be different colors or shades on the color spectrum between dark green and dark red, with the higher values closer to the dark green on the color spectrum and lower values closer to dark red.

Additionally, the blocks may contain at least part of the text of the suggested search query. In some embodiments, the blocks contain the text which is in addition to the search query portion. For example, if the search query portion is "New York" and one of the suggested search queries is "New York City," the block may contain the text "City."

Further, the blocks may be sized to represent their respective feature value. For example, a block representing a suggested search query with a higher property value may appear larger than a block representing a suggested search query with a lower property value. Additionally, the blocks may be arranged based on their property values.

At step 160, block selections are received from the client computer system. The user of the client computer system may select one or more blocks. The selected blocks may be transmitted by the client computer system. In some embodiments, a search conjunction is also received from the client computer system. The user of the client computer system may choose between conjunctions such as "and" or "or." The search conjunction may be used to combine the suggested search queries represented by the selected blocks. At step 170, a search of at least one data source is performed using the suggested search queries represented by the selected blocks, and the results are transmitted to the client computer system.

Figure 2:
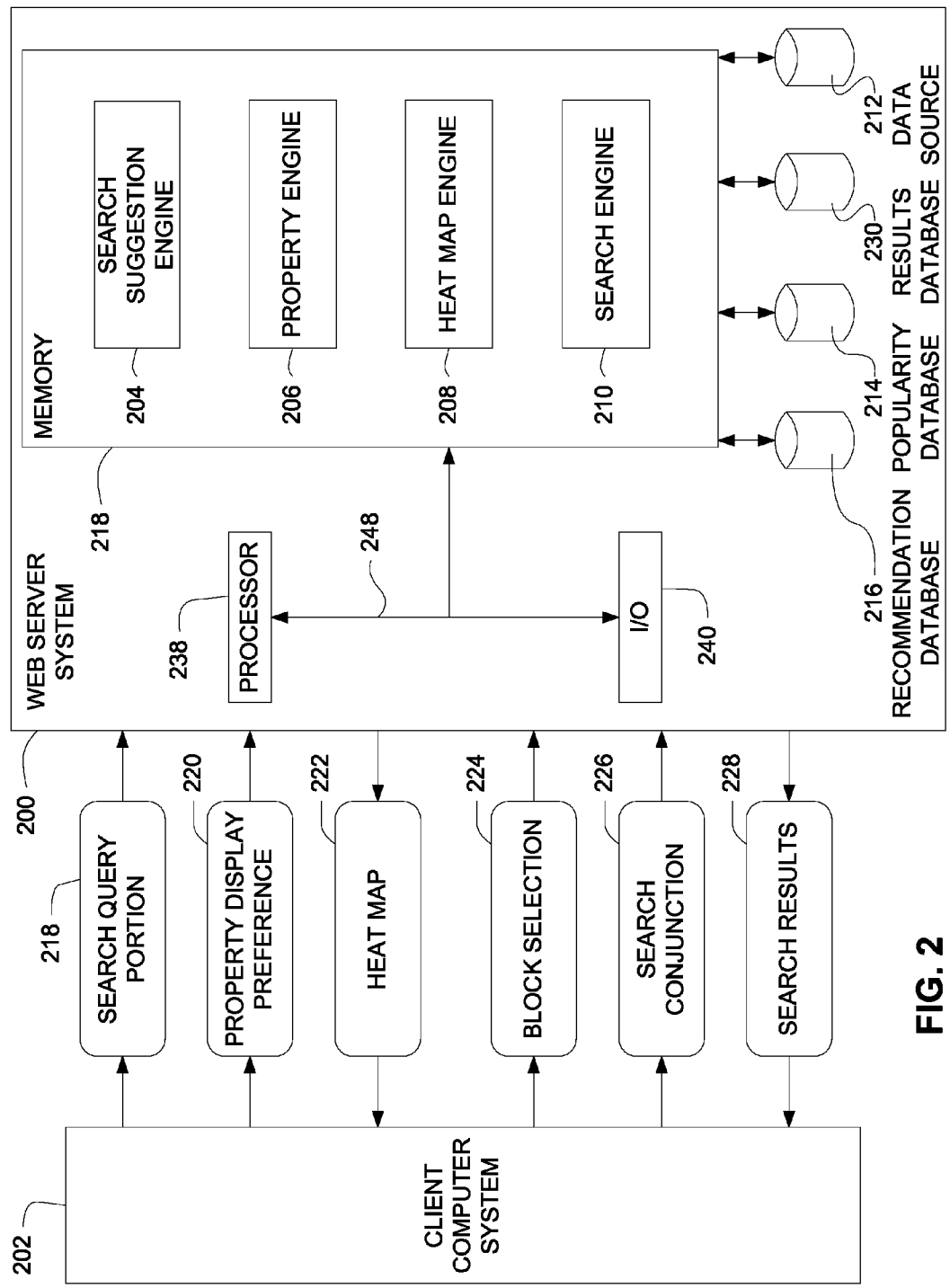
FIG. 2 depicts a block diagram of an example computer system for providing a heat map of suggested search queries.

FIG. 2 depicts a web server system 200 having search suggestion engine 204, property engine 206, heat map engine 208, and search engine 210. As shown, client computer system 202 transmits search query portion 218 to web server system 200. In some embodiments, client computer system 202 also transmits property display preference 220. In some embodiments, property display preference 220 is preprogrammed in web server system 200 and not received from client computer system 202. Search suggestion engine 204 may identify suggested search queries based on search query portion 218. There are methods know in the art for obtaining suggested search queries based on a search query portion.

Property engine 206 may retrieve property values for each of the suggested search queries produced by search suggestion engine 206. The property values retrieved may be based on property display preference 220. In some embodiments, display preference 220 may be one of "search results," "recommendations," and "popularity."

When display preference 220 is "search results," property engine 206 may retrieve property values representing the number of search results that each search suggestion would produce when run by search engine 210 on data source 212. In some embodiments, results database 230 may be maintained which stores the number of search results retained from previous searches. Property engine 206 may retrieve property values for search results from results database 230. In some embodiments, search engine 210 may perform a search on data source 212 for each of the suggested search queries and provide the number of search results to property engine 206.

When display preference 220 is "popularity," property engine 206 may retrieve property values representing the number of times each search suggestion has been searched on web server system 200. Popularity database 214 may store data on the number of times each search query is executed by search engine 210 on data source 212. Popularity database 214 may further organize this data temporally such as the number of searches for each query in the past week or past month. Property engine 206 may retrieve property values from popularity database 214. Property engine 206 may retrieve property values representing the past week, month, year, or any other time period.

When display preference 220 is "recommendations," property engine 206 may retrieve property values representing the number of recommendations which would be included in the results for a search using each of the suggested search queries. Methods for providing recommended search results are known in the art. The property value may represent the total number of recommendations in the search results or the number of results in the search results which have at least one recommendation. Recommendation database 216 may store recommendation data from previous searches conducted by search engine 210 on data source 212. Property engine 206 may retrieve property values from recommendation database 216.

The display preferences and associated property values discussed above are provided as examples of embodiments of the present invention. Any display preference and any property value which represents a property of a suggested search query may be used.

Heat map engine 208 may create heat map 222 based on the suggested search queries produced by search suggestion engine 204 and the associated property values obtained by property engine 208. Heat map 222 may contain several blocks, with each block representing one of the suggested search queries. Each block may contain all or part of the text of the suggested search query. In some embodiments, each block may contain only the text which is in addition to search query portion 218. Each block may be assigned a color code which represents its respective search suggestion property value. In some embodiments, the color code may represent the magnitude of the property value. In other embodiments, the color code may represent the magnitude of the property value relative to the property values for the other suggested search queries. Additionally, the size of each block may represent the magnitude or relative magnitude of the property value.

Web server system 200 may transmit heat map 222 to client computer system 202. A user of client computer system 202 may select one or more blocks of heat map 222. Client computer system 224 may transmit the block selection 224 to web server system 200. In some embodiments, a user of client computer system 202 may also select a search conjunction 226. Search conjunction 226 may indicate how to combine the suggested search queries in the selected blocks for execution on search engine 210. Example search conjunctions are "and" and "or." The search conjunction "and" may cause search engine 210 to search for results which contain all the suggested search queries contained in the selected blocks. The search conjunction "or" may cause search engine 210 to find results which contain any one of the suggested search queries contained in the selected blocks. Client computer system 226 may transmit search conjunction 226 to web server system 200.

Search engine 210 may take block selection 224 and, in some embodiments, search conjunction 226 to construct a search query. The search query may be executed by search engine 210 on data source 212 to obtain search results 228. Data source 212 may be any source of data such as the World Wide Web and may include multiple sources of data. Web server system 200 may transmit search results 228 to client computer system 202.

It is understood that web server system 200 may be implemented as any type of computing infrastructure. Such a computing infrastructure generally includes a processor 238, input/output (I/O) 240, and bus 248. Processor 238 may comprise a single processing unit, or be distributed across one or more processing units in one or more locations, e.g. on a client and server. Memory 218 may comprise any known type of data storage and/or transmission media, including magnetic media, optical media, random access memory, read-only memory, a data cache, a data object, etc. Moreover, memory 218 may reside at a single physical location, comprising one or more types of data storage, or be distributed across a plurality of physical systems in various forms.

I/O 240 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 248 provides a communication link between each of the components in web server system 200 and likewise may comprise any known type of transmission link, including electrical, optical, wireless, etc. Although not shown, additional components, such as cache memory, communication systems, system software, etc., may be incorporated.

Access to web server system 200 may be provided over a network such as the Internet, a local area network, a wide area network, a virtual private network, etc. Communication could occur via a direct hard-wired connection (e.g., serial port), or via an addressable connection that may utilize any combination of wireline and/or wireless transmission methods. Moreover, conventional network connectivity, such as Token Ring, Ethernet, WiFi, or other conventional communications standards could be used. Still yet, connectivity could be provided by conventional TCP/IP sockets-based protocol. In this instance, an internet service provider could be used to establish interconnectivity. Further, as indicated above, communication could occur in a client-server or server-server environment.

Figure 3:
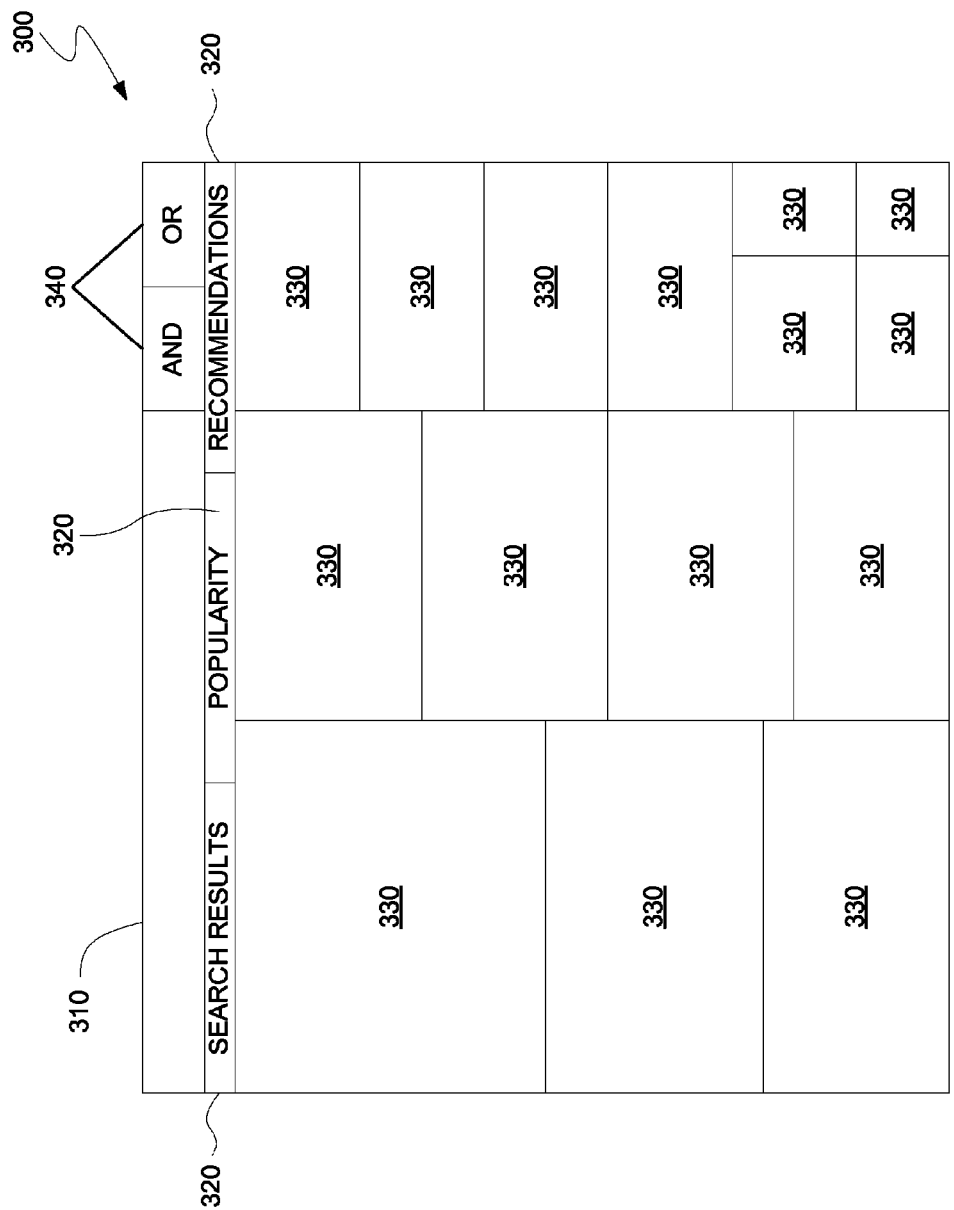
FIG. 3 depicts an example user interface according to an embodiment of the invention.

Referring now to FIG. 3, an example user interface 300 with a heat map which visually represents suggested search queries is illustrated. A user may enter a search query portion into box 310. Boxes 320 may provide feature display preferences that the user can select. Blocks 330 represent identified suggested search queries. Each block 330 may contain at least some of the text of the suggested search query it represents. Blocks 330 may each be colored to represent a feature value of the suggested search based on the selected feature display preference. In some embodiments, blocks 320 may not be displayed and the feature display preference may be predetermined. As shown, blocks 330 may be different sizes where the size represents the feature value of the suggested search. One or more of blocks 330 may be selected by the user to search on one or more data sources. Additionally, one of the search conjunctions in boxes 340 may be selected for combining the suggested search queries represented by the selected blocks 330.

Figure 4:
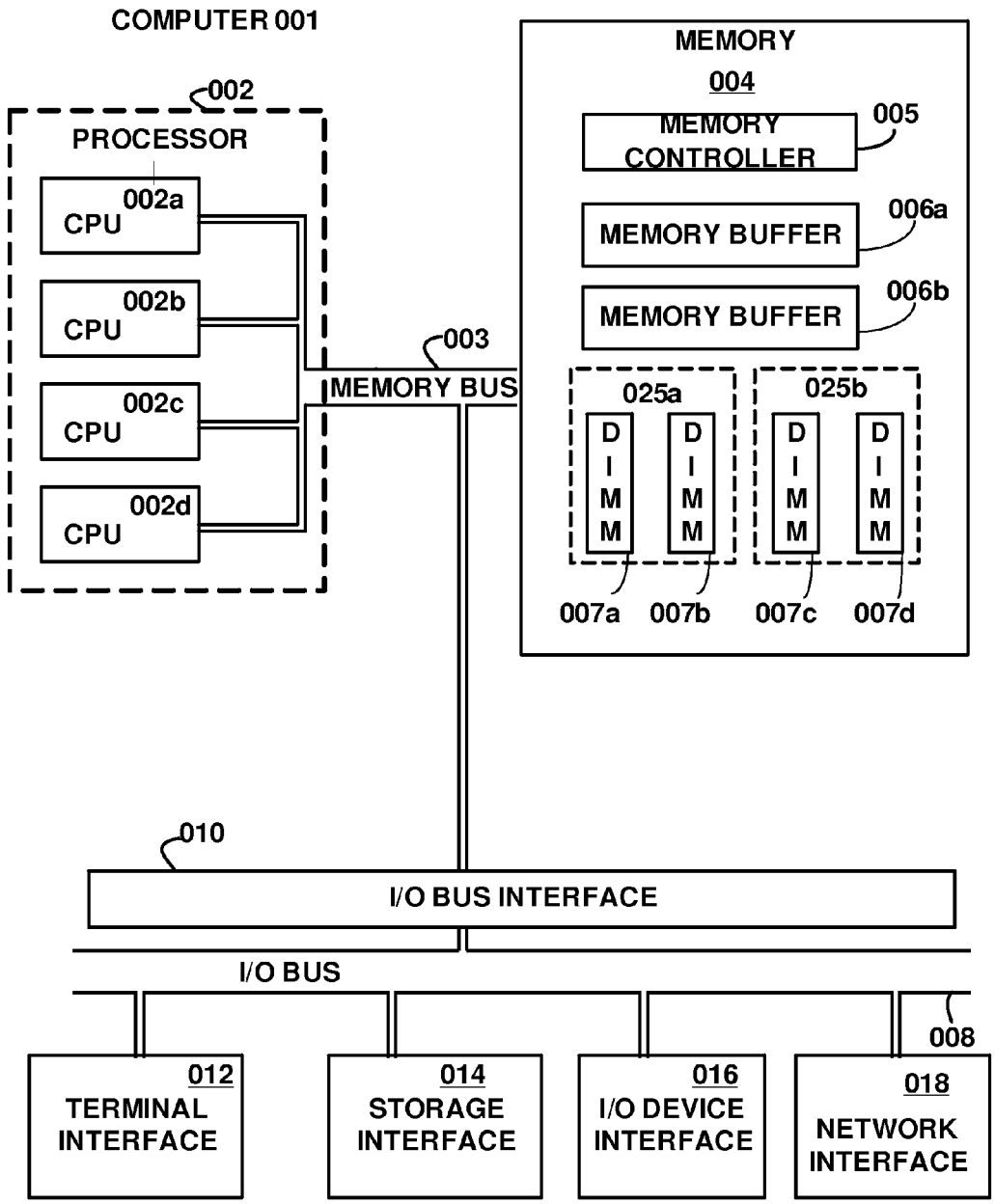
FIG. 4 depicts a block diagram of an example computer system for providing a heat map of suggested search queries.

FIG. 4 depicts a high-level block diagram of an example system for implementing an embodiment. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips 015a-015n (collectively referred to as 015) mounted on a printed circuit board and designed for use in personal computers, workstations, and servers. The use of DRAMs 015 in the illustration is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM 0015 may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments are not intended to limit the present invention. Indeed, other alternative hardware and/or program environments may be used without departing from the scope of embodiments of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising a computer readable storage medium having program code embodied therewith, the program code executable by a computer system to perform a method comprising:
   receiving a search query portion;
   identifying a plurality of suggested search queries based on the search query portion;
   determining a feature value for each of the plurality of suggested search queries, the feature value for each of the plurality of suggested search queries is a numerical value based on a feature display preference; and
   transmitting to a client computer system a heat map of the plurality of suggested search queries, the heat map containing a plurality of blocks visually representing the plurality of suggested search queries and the determined feature values, each block of the plurality of blocks representing one suggested search query from the plurality of suggested search queries, each block of the plurality of blocks visually representing the determined feature value using at least one block property selected from the group consisting of color of the block and size of the block, wherein the color of the block and the size of the block is specified by the determined feature value.

2. The computer program product of claim 1, wherein the feature display preference is selected from the group consisting of search results, recommendations, and popularity.

3. The computer program product of claim 1, wherein the method further comprises:
   receiving a selection of at least one block from the heat map; and
   performing a search on at least one data source based on the selection.

4. The computer program product of claim 3, wherein the selection of at least one block is a selection of two or more blocks, and wherein the method further comprises:
   receiving a search conjunction for combining the selected two or more blocks from the heat map; and
   constructing a search query using the search conjunction and the two or more blocks, wherein the search is performed using the constructed search query.

5. The computer program product of claim 1, wherein the method further comprises:
   receiving a second selection of the feature display preference from the client computer system;
   determining a second feature value for each of the plurality of suggested search queries based on the feature display preference; and
   transmitting to the client computer system a second heat map of the suggested search queries, the second heat map containing a plurality of blocks visually representing the plurality of suggested search queries and the second determined feature values.

6. The computer program product of claim 1, wherein the plurality of blocks are organized by magnitude of the determined feature values.

7. The computer program product of claim 1, wherein the plurality of blocks visually represent the determined feature values using size and color of the blocks.

8. A computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions for execution comprising:
   program instructions to receive a search query portion;
   program instructions to identify a plurality of suggested search queries based on the search query portion;
   program instructions to determine a feature value for each of the plurality of suggested search queries, the feature value for each of the plurality of suggested search queries is a numerical value based on a feature display preference; and
   program instructions to transmit to a client computer system a heat map of the plurality of suggested search queries, the heat map containing a plurality of blocks visually representing the plurality of suggested search queries and the determined feature values, each block of the plurality of blocks representing one suggested search query from the plurality of suggested search queries, each block of the plurality of blocks visually representing the determined feature value using at least one block property selected from the group consisting of color of the block and size of the block, wherein the color of the block and the size of the block is specified by the determined feature value.

9. The computer system of claim 8, wherein the program instructions for execution further comprise:
   program instructions to receive a selection of at least one block from the heat map; and
   program instructions to perform a search on at least one data source based on the selection.

10. The computer system of claim 8, wherein the program instructions for execution further comprise:
    program instructions to receive a second selection of the feature display preference from the client computer system;
    program instructions to determine a second feature value for each of the plurality of suggested search queries based on the feature display preference; and
    transmitting to the client computer system a second heat map of the suggested search queries, the second heat map containing a plurality of blocks visually representing the plurality of suggested search queries and the second determined feature values.

11. The computer system of claim 9, wherein the selection of at least one block is a selection of two or more blocks, and wherein the program instructions for execution further comprise:
    program instructions to receive a search conjunction for combining the selected two or more blocks from the heat map; and program instructions to construct a search query using the search conjunction and the two or more blocks, wherein the search is performed using the constructed search query.

12. The computer system of claim 8, wherein the plurality of blocks are organized by magnitude of the determined feature values.

13. The computer system of claim 8, wherein the plurality of blocks visually represent the determined feature values using size and color of the blocks.

* * * * *